United States Patent
Fujiyama et al.

(10) Patent No.: US 6,928,391 B2
(45) Date of Patent: Aug. 9, 2005

(54) PLANT MAINTENANCE METHOD AND APPARATUS

(75) Inventors: Kazunari Fujiyama, Kanagawa-ken (JP); Toshihiro Fujiwara, Kanagawa-ken (JP); Kazuhiro Saito, Kanagawa-ken (JP); Taiji Hirawawa, Kanagawa-ken (JP); Satoshi Nagai, Kanagawa-ken (JP); Hitoshi Kichise, Kanagawa-ken (JP); Mitsuyoshi Okazaki, Saitama-ken (JP); Hirotsugu Kodama, Tokyo-to (JP); Seiichi Asatsu, Kanagawa-ken (JP); Masanori Minowa, Tokyo-to (JP); Takayuki Iwahashi, Kanagawa-ken (JP); Shigeru Harada, Tokyo-to (JP); Mamoru Sudo, Kanagawa-ken (JP); Fumiharu Ishii, Tokyo-to (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 10/409,278

(22) Filed: Apr. 9, 2003

(65) Prior Publication Data

US 2003/0191606 A1 Oct. 9, 2003

(30) Foreign Application Priority Data

Apr. 9, 2002 (JP) ........................................ 2002-106705

(51) Int. Cl.$^7$ .............................................. G06F 15/00
(52) U.S. Cl. ........................ 702/185; 702/182; 702/184
(58) Field of Search .......................... 702/35, 182, 184, 702/185, 186, 187, 188; 376/215, 216, 217; 700/83, 96, 109

(56) References Cited

U.S. PATENT DOCUMENTS

| 5,311,562 | A | 5/1994 | Palusamy et al. |
| 5,648,919 | A | 7/1997 | Yamauchi et al. |
| 5,970,437 | A | 10/1999 | Gorman et al. |
| 6,505,145 | B1 * | 1/2003 | Bjornson .................... 702/185 |
| 6,618,692 | B2 * | 9/2003 | Takahashi et al. .......... 702/188 |

OTHER PUBLICATIONS

U.S. Appl. No. 10/409,277, filed Apr. 9, 2003, Fujiyama et al.

* cited by examiner

*Primary Examiner*—Bryan Bui
(74) *Attorney, Agent, or Firm*—Foley & Lardner LLP

(57) ABSTRACT

Data on inspection, diagnosis, repair and operation histories are entered in a plant-maintenance apparatus for equipment that constitute a plant to be maintained. Failure-event tree breakdown is performed on failures to be expected for the equipment. Unreliability is predicted of at least one starting item in the failure-event tree breakdown. Unreliability of each item in the failure-event tree is calculated based on a failure unreliability function. Unreliability and a cost of recovery from each failure event in the failure-event tree are multiplied and results of the multiplication are accumulated in accordance with the tree breakdown to obtain a recovery cost. Preventive maintenance expenses are calculated for preventing failure events. Maintenance timing and technique are decided through comparison between the recovery cost and the preventive maintenance expenses.

12 Claims, 17 Drawing Sheets

| CAUSAL EVENT \ RESULTANT EVENT | INTERNAL-CASING CORNER-SECTION CRACK | OUTER-CASING PIPE JOINT CRACK | OUTER-CASING EXTRACTION-OPENING WELDED-SECTION CRACK | HORIZONTAL JOINT SURFACE CREEP DEFORMATION | CREEP-DAMAGE AND FATIGUE CRACK DEVELOPMENT | FEMALE SCREW DAMAGE | BOLT DAMAGE | STEAM LEAKAGE | CASING EROSION | CASING FAILURE |
|---|---|---|---|---|---|---|---|---|---|---|
| INTERNAL-CASING CORNER-SECTION CRACK | F01 | F0102 | F0103 | — | F0105 | — | — | F0108 | F0109 | F0110 |
| OUTER-CASING PIPE JOINT CRACK | — | F02 | F0203 | — | F0205 | — | — | F0208 | F0209 | F0210 |
| OUTER-CASING EXTRACTION-OPENING WELDED-SECTION CRACK | — | — | F03 | — | F0305 | — | — | F0308 | F0309 | F0310 |
| HORIZONTAL JOINT SURFACE CREEP DEFORMATION | — | — | — | F04 | F0405 | F0406 | F0407 | F0408 | F0409 | F0410 |
| CREEP-DAMAGE AND FATIGUE CRACK DEVELOPMENT | — | — | — | — | F05 | F0506 | F0507 | F0508 | F0509 | F0510 |
| FEMALE SCREW DAMAGE | — | — | — | — | — | F06 | F0607 | F0608 | F0609 | F0610 |
| BOLT DAMAGE | — | — | — | — | — | F0706 | F07 | F0708 | F0709 | F0710 |
| STEAM LEAKAGE | — | — | — | — | — | F0806 | F0807 | F08 | F0809 | F0810 |
| CASING EROSION | — | — | — | — | — | — | — | — | F09 | F0910 |
| CASING FAILURE | — | — | — | — | — | — | — | — | — | F10 |

FIG. 5

PLANT MAINTENANCE METHOD AND APPARATUS

CROSS REFERENCE TO RELATED APPLICATION

This application is based upon and claims the benefit of priority from the prior Japanese Patent Application No. 2002-106705, filed on Apr. 9, 2002, the entire contents of which are incorporated herein by reference.

BACKGROUND OF THE INVENTION

The present invention relates to risk-based plant-maintenance apparatus and method for maintaining plant equipment such as steam turbines for thermal power plants, against damage, efficiency decay and shutdown.

Increase in the number of plants such as thermal power plants operating for long years has demanded maintenance at low cost but with no failures. Risk-based maintenance (RBM) has been recently introduced as one of the solutions to match the demands.

A known RBM is to decide maintenance priority allocations based ranking in the order of combinations of classified plant-equipment failure rates and consequence of failure, such as, disclosed by Kihara et el., in Piping Technology, pages 76 to 79, issued in December, 2000.

Classification of consequence of failure, however, requires experimental qualitative decision making, and hence has several drawbacks, for example, it does not necessarily involve quantitative evaluation.

In addition, no one has proposed so far is an assessment technique, the combination of risk-based assessment and life, efficiency and operational-function diagnosis already employed in plant management.

SUMMARY OF THE INVENTION

With the foregoing as background, it is an object of the present invention to provide a method and an apparatus for objectively and quantitatively deciding the optimum maintenance timing with by risk-based cost estimation covering all expected failure events based on prediction of damage, efficiency decay and shutdown.

The present invention provides an apparatus for maintaining plant equipment, which includes: an input unit configured to receive data on inspection, diagnosis, repair and operation histories for equipment that constitute a plant; a failure-event tree breakdown unit configured to perform failure-event tree breakdown on failures to be expected for the equipment, in order to obtain a failure-event tree; a probabilistic life assessment unit configured to predict unreliability of a starting item in the failure-event tree breakdown; a failure-unreliability function calculation unit configured to calculate unreliability of each item in the failure-event tree; a failure-derived monetary loss calculation unit configured to multiply each unreliability and a cost of recovery from each failure event in the failure-event tree and accumulate results of the multiplication in accordance with the failure-event tree breakdown, thus obtaining a recovery cost; a preventive-maintenance expense calculation unit configured to calculate preventive maintenance expenses for preventing failure events; and an operation and maintenance decision-making unit configured to decide maintenance timing and technique through comparison between the recovery cost and the preventive maintenance expenses.

Moreover, the present invention provides an apparatus for maintaining plant equipment, which includes: an input unit configured to receive data on inspection, diagnosis, repair and operation histories for equipment that constitute a plant; an efficiency and operational-function decay-event tree breakdown unit configured to perform efficiency and operational-function decay-event tree breakdown on efficiency and operational-function decay factors to be expected for the equipment, in order to obtain an efficiency and operational-function decay-event tree; an efficiency and operational-function decay parameter assessment unit configured to predict unreliability of a starting item in the efficiency and operational-function decay-event tree breakdown; an efficiency and operational-function decay unreliability calculation unit configured to calculate unreliability of each item in the efficiency and operational-function decay-event tree based on failure unreliability function; an efficiency and operational-function decay prediction unit configured to calculate efficiency and operational-function decay to be expected based on prediction by the efficiency and operational-function decay unreliability calculation unit; an efficiency and operational-function decay derived monetary loss calculation unit configured to multiply each unreliability and monetary loss due to efficiency and operational-function decay and a cost of recovery from the decay and accumulate results of the multiplication in accordance with the efficiency and operational-function decay-event tree breakdown; a preventive-maintenance expense calculation unit configured to calculate preventive maintenance expenses for preventing the efficiency and operational-function decay; and an operation and maintenance decision-making unit configured to decide maintenance timing and technique through comparison between the recovery cost and the preventive maintenance expenses.

Furthermore, the present invention provides a method of maintaining plant equipment, which includes the steps of: receiving data on inspection, diagnosis, repair and operation histories for equipment that constitute a plant; performing failure-event tree breakdown on failures to be expected for the equipment, thereby obtaining a failure-event tree; predicting unreliability of a starting item in the failure-event tree breakdown; calculating unreliability of each item in the failure-event tree based on failure unreliability function; multiplying each unreliability and a cost of recovery from each failure event in the failure-event tree breakdown and accumulating results of the multiplication in accordance with the tree breakdown, thus obtaining a recovery cost; calculating preventive maintenance expenses for preventing failure events; and deciding maintenance timing and technique through comparison between the recovery cost and the preventive maintenance expenses.

Moreover, the present invention provides a method of maintaining plant equipment, which includes the steps of: receiving data on inspection, diagnosis, repair and operation histories for equipment that constitute a plant; performing efficiency and operational-function decay event-tree breakdown on efficiency and operational-function decay factors to be expected for the equipment, thereby obtaining an efficiency and operational-function decay event-tree; predicting unreliability of at least one starting item in the efficiency and operational-function decay event-tree breakdown; calculating unreliability of each item in the efficiency and operational-function decay-event tree based on failure unreliability function; calculating efficiency and operational-function decay to be expected from the calculation based on the failure unreliability function; multiplying each unreliability and monetary loss due to efficiency and operational-function decay and a cost of recovery from the decay and accumulating results of the multiplication in accordance with the efficiency and operational-function decay-event tree breakdown; calculating preventive maintenance expenses for preventing the efficiency and operational-function decay; and deciding maintenance timing and technique through comparison between the recovery cost and the preventive maintenance expenses.

BRIEF DESCRIPTION OF DRAWINGS

FIG. 5 shows a matrix indicating a failure-unreliability function database in the first embodiment according to the present invention;

DETAILED DESCRIPTION OF THE EMBODIMENTS

Several embodiments according to the present invention will be disclosed with reference to the attached drawings.

Figure 1:
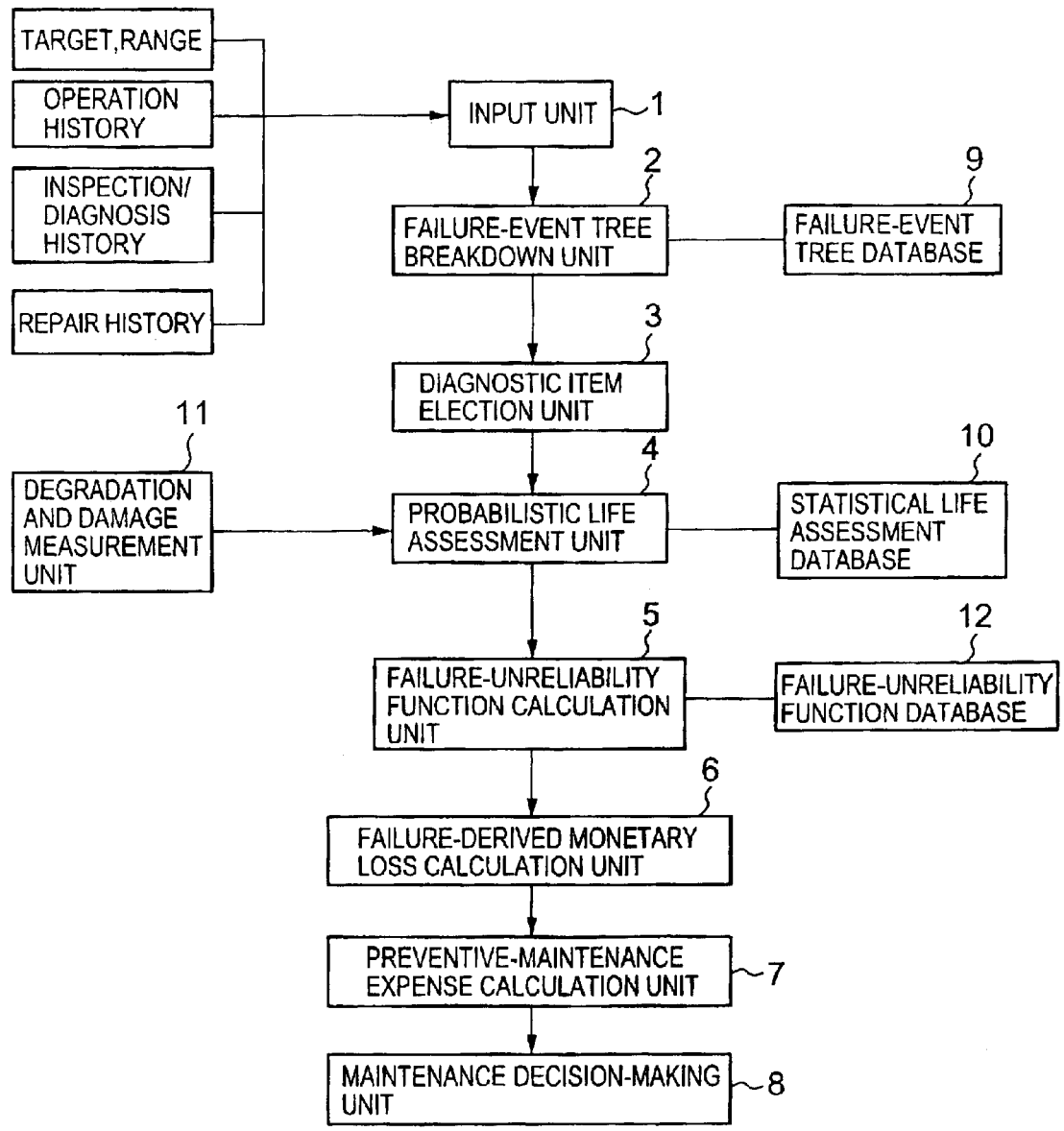
FIG. 1 shows a block diagram of a first embodiment according to the present invention.

FIG. 1 shows a block diagram of a first embodiment according to the present invention. A plant-maintenance apparatus incorporates an input unit 1, a failure-event tree breakdown (FETB) unit 2, a diagnostic item election (DIS) unit 3, a probabilistic life assessment (PLA) unit 4, a failure-unreliability function calculation (FUFC) unit 5, a failure-derived monetary loss calculation (FDMLC) unit 6, a preventive-maintenance expense calculation (PMEC) unit 7 and a maintenance decision-making (MDM) unit 8.

Entered via the input unit 1 are inspection-, diagnosis-, repair- and operation-history information, such as, targets and ranges or a list of component parts of the plant equipment to be maintained, operation hours and operation-start/halt times, failures, damage, degradations and their indications. Disclosed below are operations of the first embodiment against cracks to steam-turbine casing.

Figure 2:
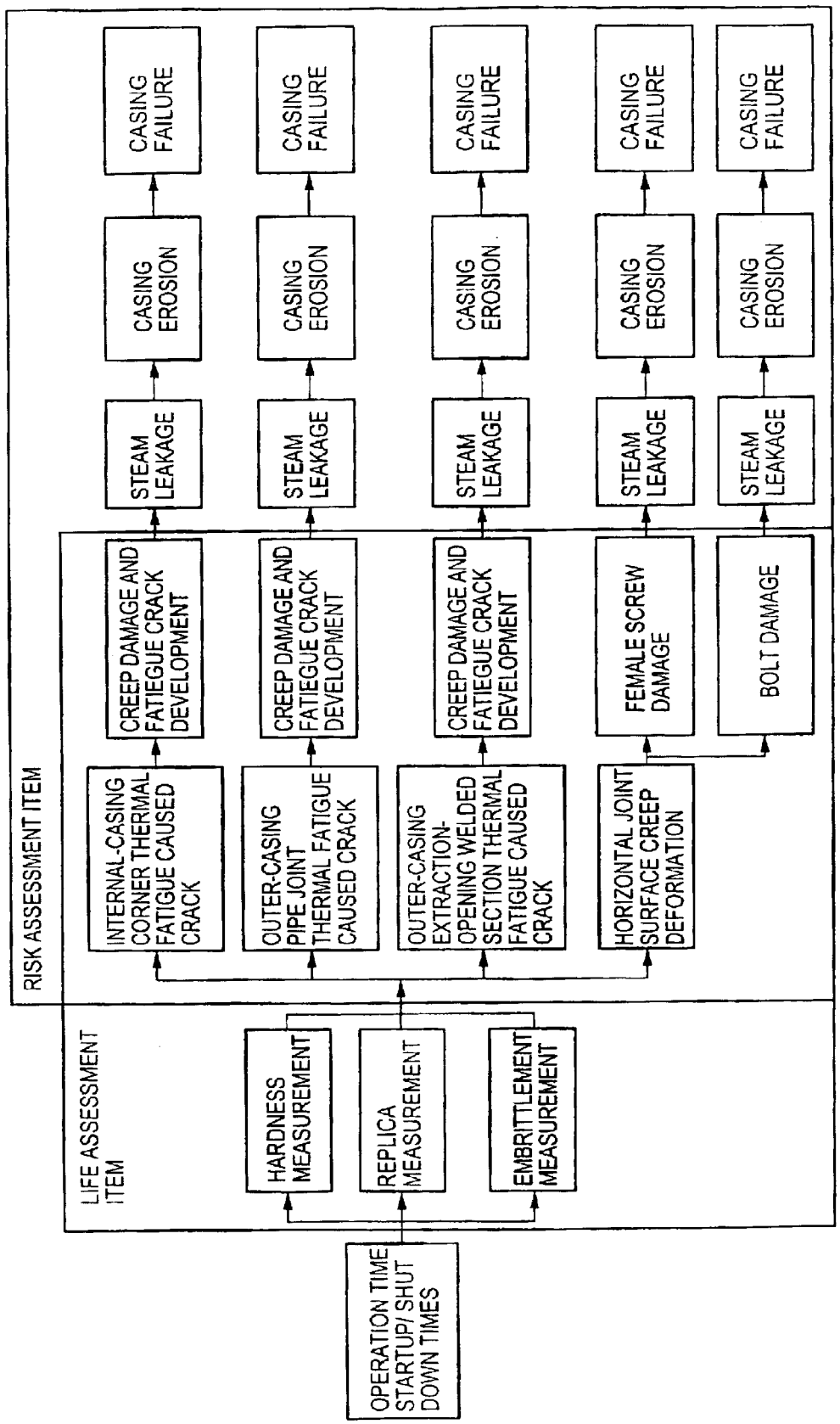
FIG. 2 shows a block diagram indicating failure-event tree breakdown in the first embodiment according to the present invention.

A steam-turbine casing could suffer fatigue damage accumulation due to thermo-mechanical stresses caused by variation in steam temperature and pressure during startup and shutdown, and also creep damage accumulation due to pressure and thermal stresses during steady operation. The creeps lead to cracks and deformation. Against such events, the FETB unit 2 constructs a failure-event tree indicating causal sequences, such as shown in FIG. 2, based on data stored in a failure-event tree (FET) database 9. Items for life assessments are cracks due to thermal fatigue of internal-casing corners, outer-casing pipings and welded sections about extraction ports of an outer-casing and creep deformation of horizontal joints. These four items are starting items (starting failure events) in the failure-event tree and selected as diagnostic items at the DIS unit 3.

Figure 3:
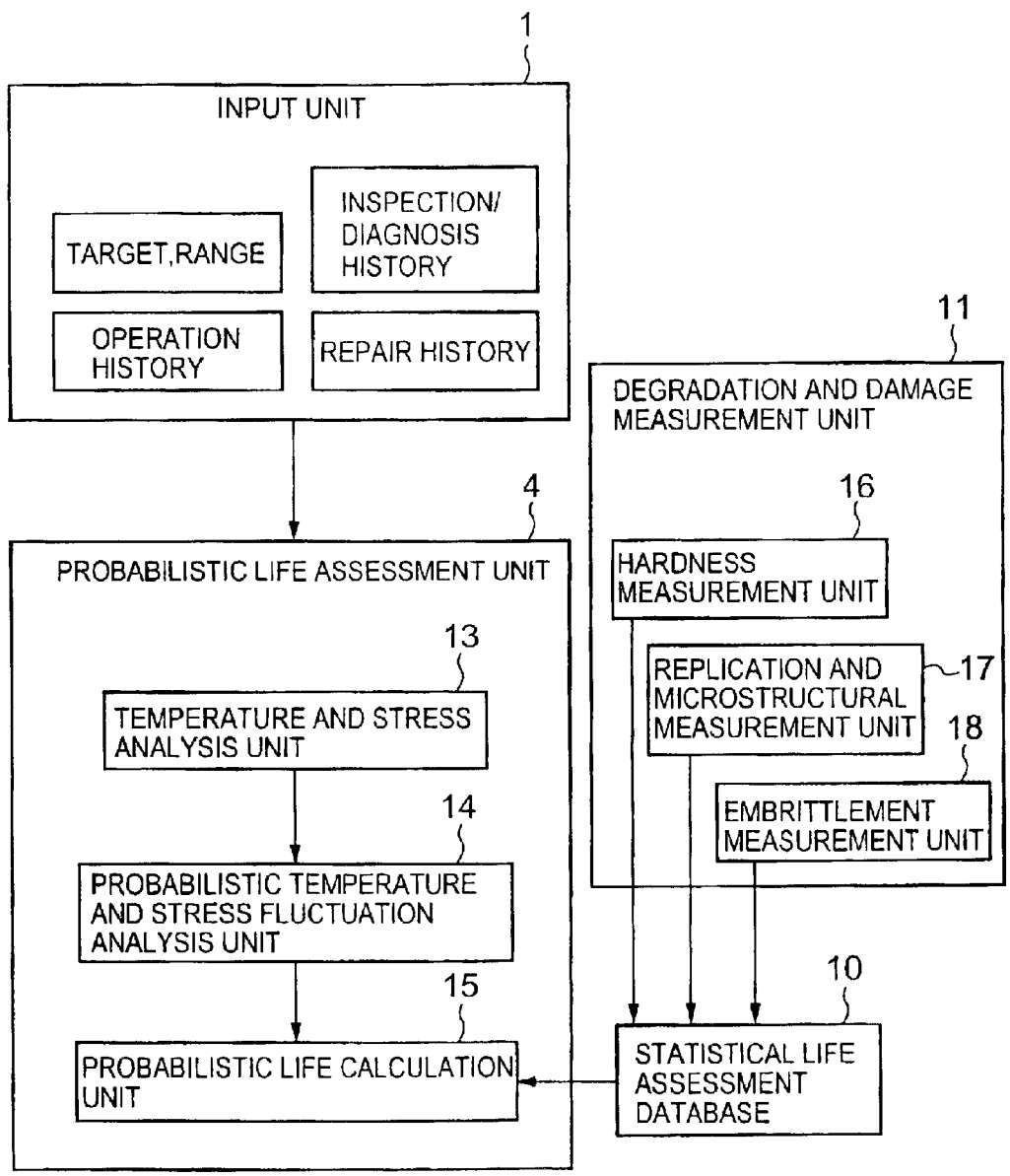
FIG. 3 shows a block diagram indicating a life assessment procedure in the first embodiment according to the present invention.

The PLA unit 4 predicts unreliability of the starting items in the failure-event tree based on stored data from a statistical life assessment (SLA) database 10 and also measured data from a degradation and damage measurement (DDM) unit 11. As shown in FIG. 3, the PLA unit 4 comprises a temperature and stress analysis (TSA) unit 13, a probabilistic temperature and stress fluctuation analysis (PTSFA) unit 14 and a probabilistic life calculation (PLC) unit 15. Also as shown in FIG. 3, the DDM unit 11 comprises a hardness measurement (HM) unit 16, a replication and microstructural measurement (RMM) unit 17 and an embrittlement measurement (EM) unit 18. The PLA unit 4 and the DDM unit 11 select material properties stored in the SLA database 10 in accordance with damage to or degradations of equipment or parts to be diagnosed.

Figure 4:
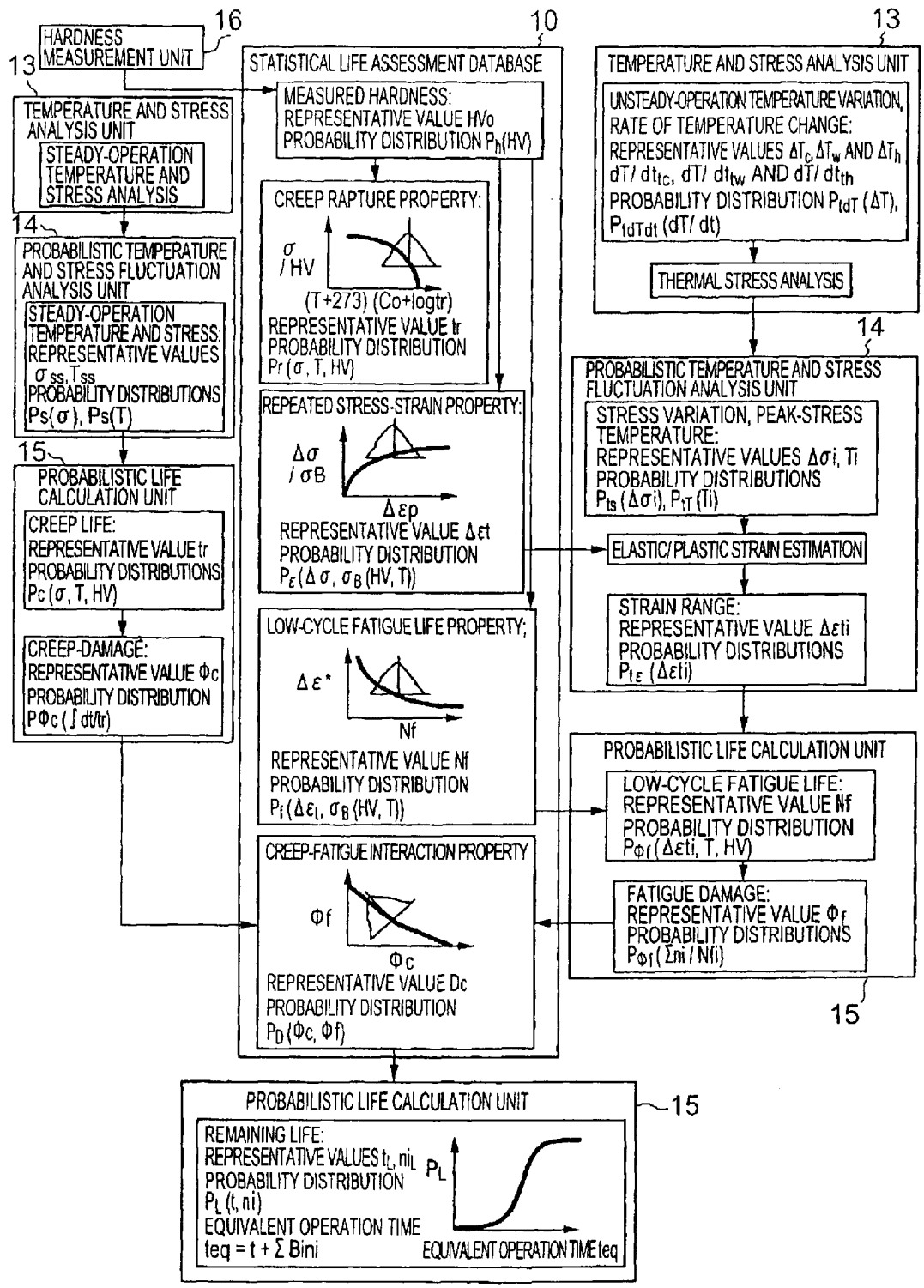
FIG. 4 shows a block diagram indicating probabilistic creep- and fatigue-life assessment procedures with hardness analysis in the first embodiment according to the present invention.

Shown in FIG. 4 is a functional procedure for the PLA unit 4. The TSA unit 13 calculates fluctuation of temperature and stress using the finite element method based on several factors indicating operational conditions such as fluid temperature, fluid pressure, flowrate, rotation speed and load, in steady operation. These input factors have been listed in tables as probability distributions that are statistical fluctuations obtained from the plant operation history. The probability distributions are converted by the PTSFA unit 14 into a temperature probability distribution Ps(T) with a temperature representative value Tss and a stress probability distributions Ps(σ) with a stress representative value σss, respectively. The temperature and stress probability distributions may be obtained through simulation analysis with the finite element method using operational-condition-factor-probability-distribution parameters. Alternatively, the probability distributions may be obtained through Monte Carlo simulation with established relationship between the operational-condition factors and temperature and also stress based on analysis with the finite element method using experimental design.

Creep damage is accumulated in component part materials as time elapses in steady operation. A creep rupture time tr(h), which can be used for creep-damage estimation based on temperature and stress, is expressed as below, with hardness HV, temperature T(° C.) and stress σ(MPa)

$$tr(h)=10^{[\{A_0+A_1 \log(\sigma/HV)+A_2(\log(\sigma/HV))^2+A_3(\log(\sigma/HV))^3\}/(T+273)-C_0]} \quad (1)$$

Parameters for probability distribution Pr is decided from a ratio of experimental value tr(h) to an estimated average value given by the expression (1). The probability distribution Pr is preferably logarithmic normal distribution or Weibull distribution. The HM unit 16 employs probability distribution with hardness $HV_0$ measured for sections degraded at the same temperature as the damaged sections for assessment of creeps. The probability distribution Ph is preferably logarithmic normal distribution.

The PLC unit 15 combines the probability distribution Ph for hardness with the probability distribution Pr for creep rupture time based on the expression (1) and further the temperature and stress probability distributions Ps(T) and Ps(σ). It further calculates probability distribution Pc of creep life tr(h) for equipment or parts and a ratio of the creep life tr(h) to the operation time "t" as creep damage $\Phi_c=\int dt/tr(\sigma, T, HV)$ with its probability distribution $P_{\Phi c}$.

The combination of probability distributions is performed with integration of probability density function or Monte Carlo simulation.

In unsteady operation, the TSA unit 13 calculates temperature variations ΔTc, ΔTw and ΔTh, rate of temperature changes $dT/dt|_{tc}$, $dT/dt|_{tw}$ and $dT/dt|_{th}$ and also their probability distributions $P_{tdT}$ and $P_{tdTdt}$ per typical operation patterns, such as, cold start, hot start and thermal start, from the operation history, with thermal analysis using statistical calculation and the infinite element method, etc., for thermal stress analysis The PTSFA unit 14 calculates stress variations Δσi(i=c, w, h), the peak-stress temperature Ti(i=c, w, h) and their probability distributions $P_{tS}$ and $P_{tT}$ corresponding to the respective operation patters from the analysis with same the techniques for the steady operation.

The unit 14 also converts a stress range into the total strain range Δε(i=c, w, h) and its probability distribution $P_{t\epsilon}$ using material elastic-to-plastic repeated stress property.

The elastic-to-plastic-repeated stress property is expressed as shown below at the SLA database 10, given for each material with tensile strength and Young's modulus corresponding to measured hardness $HV_0$.

$$\Delta\epsilon_i=\Delta\sigma/E(T)+(\Delta\sigma/(D_0\sigma_B))^{1/n} \quad (2)$$

$$E(T)=\Sigma a_i T^{i-1}$$

where E(T) is Young's modulus at an assessment temperature T, "$a_i$" is a constant (i: natural number), $\sigma_B$ is tensile strength at assessment temperature (at room temperature or estimated from hardness) and $D_0$ and "n" are constants.

Conversion from stress to strain range is preferably performed with Neuber method or elastic-plastic infinite analysis. The probability distribution of the strain range is preferably performed with Monte Carlo simulation. The PLC unit 15 gives fatigue life with application of the total strain range and its probability distribution to the low-cycle fatigue life property. A low-cycle fatigue life $N_f$ is expressed at the SLA database 10 as shown below with a probability distribution $P_f$.

$$\Delta\epsilon_t=C_e/(\Delta\sigma/E)N_f^{\alpha e}+C_p N_f^{\alpha p} \quad (2)$$

where E(T) is Young's modulus at an assessment temperature T, and $C_e$, αe, $C_p$ and αp are constants.

For each startup pattern, the number of startups $n_i$(i=c, w, h) and a ratio of fatigue life $N_{fi}$(i=c, w, h) to the total strain range $\Delta\epsilon_{ti}$(i=c, w, h) are added to each other to calculate fatigue damage $\Phi_f=\Sigma n_i/N_{fi}$ and its probability distribution $P_{\Phi f}$ with probability parameter calculation or Monte Carlo simulation based on the probability distribution of fatigue life. The creep damage $\Phi_c$ and the fatigue damage $\Phi_f$ given as above are applied to creep-fatigue interaction property $$\Phi_f+\Phi_c=Dc(\Phi_f, \Phi_c) \quad (4)$$

in the SLA database 10 and its probability distribution Pp to calculate the remaining life (duration and the number of times) in accordance with the damage accumulated so far and a future operation-expected pattern. The remaining life is expressed as the equivalent operation time $t_{eq}=t+\Sigma B_i*n_i$ at the PLC unit 15, the accumulated probability distribution $P_L$ of the remaining life $t_{eq}$ is employed as unreliability.

FIG. 5 shows a list of unreliability allocated to the failure-event tree breakdown indicated in FIG. 2. For example, unreliability F01 is assigned to internal-casing corner-section thermal-fatigue cracks, one of the events for life assessments among the starting items in the failure-event tree breakdown. The subsequent events are assigned unreliability F(t), the rate of failures up to a given time "t" based on failure unreliability function in a failure-unreliability function (FUF) database 12 shown in FIG. 1.

Figure 6:
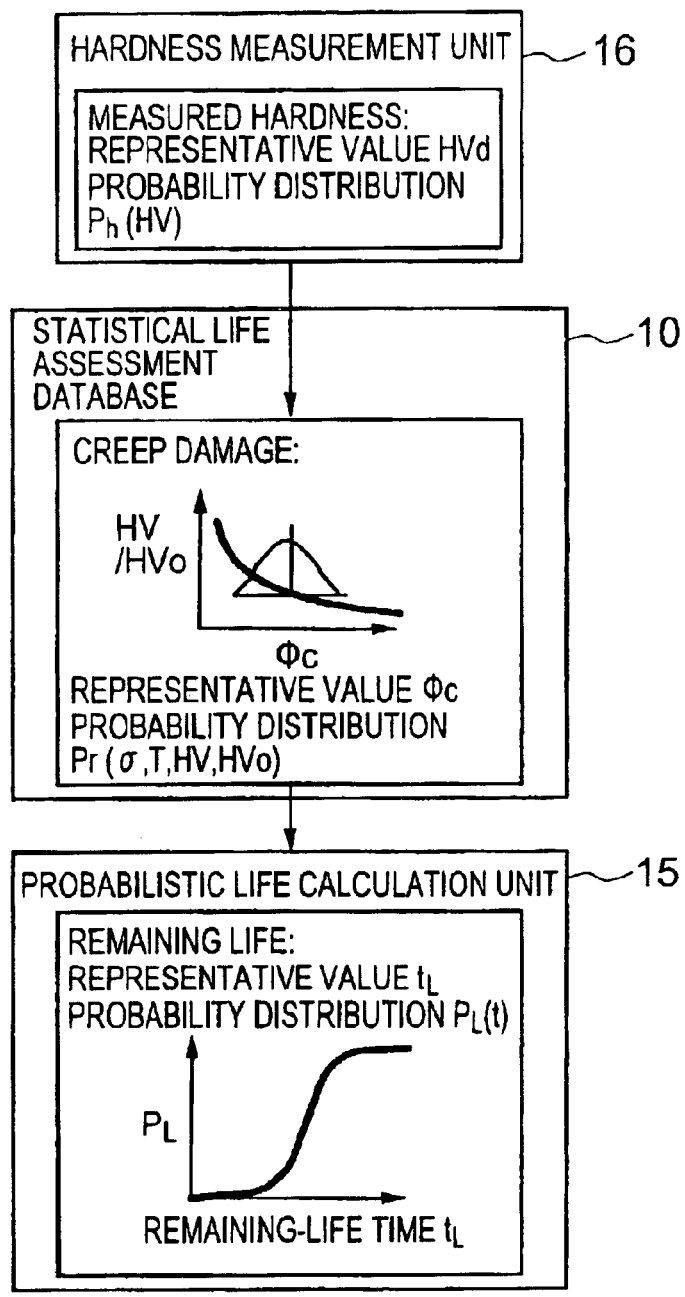
FIG. 6 shows a block diagram indicating a probabilistic creep-life assessment procedure with hardness analysis in the first embodiment according to the present invention.

The following technique can also be applied to the PLA unit 4 for directly calculating creep damage from hardness HV, as indicated in FIG. 6. The probability distribution given by experimental-data statistical processing with approximate expressions is applied to stochastic life-time calculation.

In detail, the creep damage based on the initial hardness $HV_0$ is calculated as follows:

$$\Phi_c=t/tr(\sigma, T, HV_0) \quad (5)$$

where tr(σ, T, HV) is the creep rupture time, σ stress and T temperature (K).

The creep damage based on the present hardness HV of a creep-damaged section is calculated as follows:

$$\Phi_c=t/\{t+tr(\sigma, T, HV)\} \quad (6)$$

Hardness HV, temperature T and stress σ for materials of low initial transition density, such as CrMo-piping base materials, have the following relationship based on coarse-carbide modeling.

$$HV=Ce^{1/2}/[\{T^\alpha(\sigma/E(T)So)^v \exp(-Qx/T)t/T\}A+(Ce^{1/2}/HVo)^3]^{1/3} \quad (7)$$

where
  $Ce=Cc-C_B$, $E(T)=\Sigma a_i T^{i-1}$;
  T: temperature (° C.);
  A, v, α, So and Qx: constants;
  HVo: initial hardness;
  Cc: carbon content;
  $C_B$: critical dissolving point;
  E(T): Young's modulus at temperature T; and
  $a_i$: constant (i: natural number)

Moreover, hardness HV, temperature T and stress σ for materials of high initial transition density, such as CrMo HAZ-materials and CrMoV materials, have the following relationship based on coarse-carbide modeling.

$$HV = 1/[1/HVo^2 + Bt(\sigma/E(T)So)^v \exp(-Qy/T)]^{1/2} \quad (8)$$

where B and Qy are constants.

Figure 7:
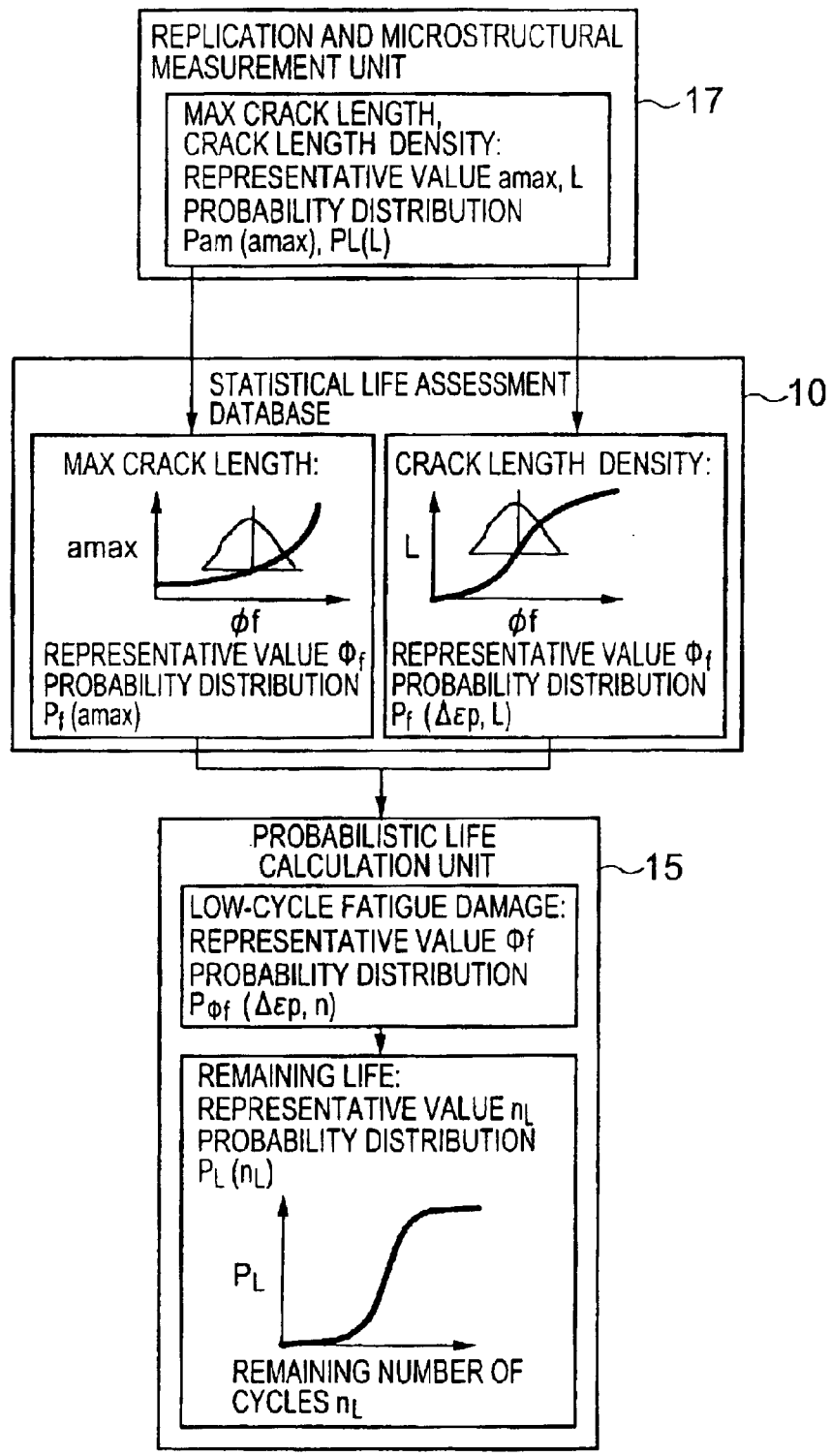
FIG. 7 shows a block diagram indicating a probabilistic fatigue-life assessment procedure with replica analysis in the first embodiment according to the present invention.

Fatigue damage and the probability distribution are assessed as indicated in FIG. 7 with the maximum crack length $a_{max}$ and crack length density L, parameters given by measurements of fatigue crack distribution using a replica.

The maximum crack length $a_{max}$ and the fatigue damage $\Phi_f = n/N_f$ have the following relationship:

$$a_{max} = E \exp(Fn/N_f) \quad (9)$$

where E and F are constants.

The crack length density L and the fatigue damage $\Phi_f = n/N_f$ have the following relationship:

$$L/lc = (2\pi)^{-1/2} \int_{-\infty}^{\{\ln(n/Nf) - \mu_{Le}\}\sigma'_{Le}} [\exp(-\mu^2/2)] du \quad (10)$$

$$\mu_{Le} = D1\Delta\epsilon_p^{ml}$$

where n: the number of repetition of strain application;

$N_f(\Delta\epsilon t, T, HV)$: the number of fatigue damage;

$\Delta\epsilon_t$: the total strain range;

T: temperature;

HV: hardness;

$\Delta\epsilon_p$: plastic strain range; and lc, $\sigma'_{Le}$, $D_1$ and $m_1$: constants.

Figure 8:
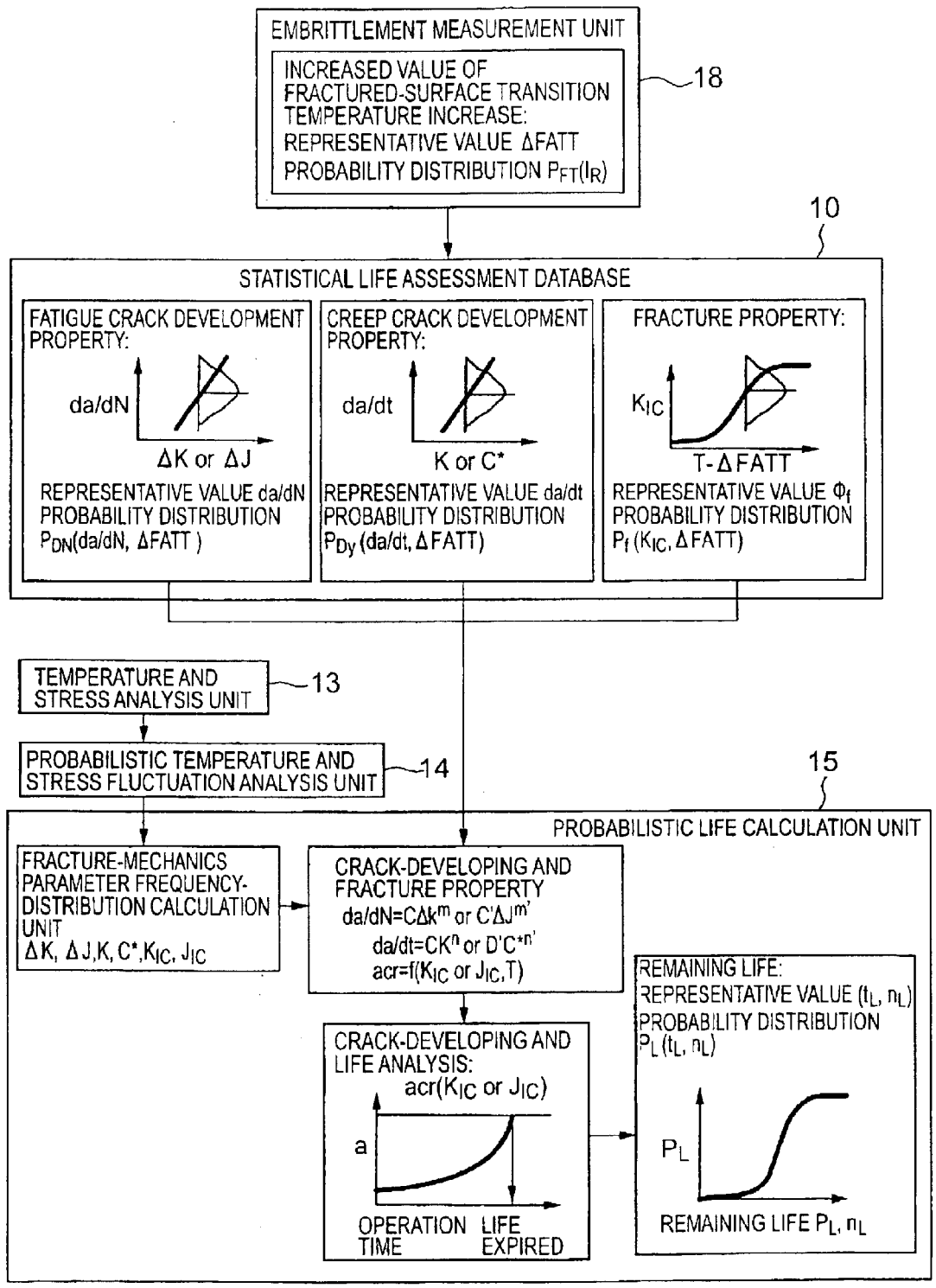
FIG. 8 shows a block diagram indicating a probabilistic developed crack-affected life assessment procedure with embrittlement measurements in the first embodiment according to the present invention.

Indicated FIG. 8 is developed crack-affected life assessment employed by the PLA unit 4. The EM unit 18 measures a temperature increase AFATT of each fractured-surface transition temperature FATT for equipment or parts, as embrittlement, with a known technique such as polarization measurements. The embrittlement is supplied to the SLA database 10 for giving fatigue-caused crack development property da/dN, creep-caused crack development property da/dt and fracture toughness as functions of ΔFATT, with probability distribution. Based on the calculations at the TSA and PTSFA units 13 and 14, the PLC unit 15 calculates stress intensity factor range ΔK or J-integration range ΔJ in unsteady operation and stress intensity factor K or creep J-integration C* in steady operation, as fracture mechanics parameters, with calculation of fatigue-crack and creep-crack developments using the following expressions.

fatigue-crack developments:

$$a = \int (da/dN) \cdot dN = \int C\Delta K^m da \quad (11)$$

or $$a = \int (da/dN) \cdot dN = \int C'\Delta J^{m'} da \quad (12)$$

creep-crack developments:

$$a = \int (da/dt) \cdot dt = \int DK^n dt \quad (13)$$

or $$a = \int (da/dt) \cdot dt = \int D'C^{*n'} dt \quad (14)$$

These calculations are performed in accordance with the operation patterns for obtaining the probability distribution through Monte Carlo simulation.

The life time is decided when the crack length reaches the limit acr=$f(K_{Ic}$ or $J_{Ic})$. The fracture toughness $K_{Ic}$ or $J_{Ic}$ that gives the limit acr is selected from the data in the SLA database 10, as a function of ΔFATT.

The FDMLC unit 6 calculates a cumulative cost Cr as shown below from unreliability Fij and Fhi and cost Ci based on recovery costs (failure-derived monetary loss) assigned to events expected from these life-time assessments. The unreliability Fij, if employing posterior-event unreliability, is required to be combined with unreliability Fhi of an event that occurs before each event expected from the life-time assessments.

$$Cr = \Sigma(\ldots Fhi \cdot Fij)Ci \quad (15)$$

The cumulative cost Cr is sent to the PMEC unit 7 for calculation of the total preventive maintenance expenses based on preventive maintenance expense assigned to several preventive measures against those events.

The total preventive maintenance expenses are sent to the MDM unit 8 for addition of depreciation and several maintenance fees to the total expenses. The expenses are expressed as a time-based function and compared with a risk cost. Maintenance timing is decided when the former is lower than the latter. If the plant is required to operate beyond the maintenance timing, life-time calculation is performed with switching the future operation patterns to select the pattern with the minimum risk cost among feasible operation patterns.

As disclosed in detail, risks are expressed as costs against any failure events to plant equipment expected based on life-time prediction and compared with the preventive maintenance expenses, thus the first embodiment offering a lowest-cost maintenance technique with the lowest risk possibility, and also the operation pattern that allows plant operation up to a desired timing with the least risk. Moreover, the failure-event tree breakdown unit has the failure-event tree database constructed based on inspection and operation histories for the plant and also other plants, for tree breakdown starting with the life-assessment candidate items based on entered equipment parts and events. The life-assessment candidate items are employed by the diagnostic item selection unit as input data or starting events in the failure-event tree, thus all of the life-assessment candidate items and the items for risk calculations being covered.

Moreover, the first embodiment calculates the life probability distribution covering the occurrence of cracks to resultant damage to equipment parts as unreliability based on the probability variation in operational requirements including temperature and stress to the parts and material-life probability distribution while referring to the data stored in the statistical life assessment database. Thus, the first embodiment accurately provides unreliability of failure events expected due to aging and also failure events that will rarely occur but cause adverse effects in the failure-event tree breakdown. Furthermore, the first embodiment calculates unreliability based on the failure unreliability function on events in the failure-event tree breakdown using the entered data on parts and events and also the unreliability of items to be diagnosed based on the results given by the probabilistic life assessment unit, thus offering reliability assessments feasible to the actual plant conditions.

The first embodiment can further adjust the order of failure-event tree breakdown and the failure unreliability function, thus achieving further accurate risk assessments in accordance with accumulated diagnostic records and data. Moreover, the probabilistic life assessment database constructed as disclosed above allows selection of the material property required for probabilistic life assessments with probability-distribution parameters based on replica observations and/or embrittlement measurements, thus offering material-life probability-distribution property matching the actual equipment conditions.

An original form of the failure-event tree is stored beforehand in the failure-event tree database 9. The original form of the failure-event tree is made by expert engineers of the plant engineering by analyzing inspection histories and operation histories of plants similar to the plant to be maintained and by examining the correlation between the failure-events based on their technical experience. When inspection data on the plant to be maintained and/or on other similar plants and operation histories of the plants are renewed, the FUFC unit 5 re-calculates the unreliability between the failure events (items). The re-calculated unreliability is stored in the failure-unreliability function database 12. In addition, the FETB unit 2 modifies the original form of the failure-event tree (or the failure-event tree having been previously modified) stored in the failure-event tree database 9 on the basis of the re-calculation of the unreliability, in other words, the FETB unit 2 performs re-breakdown of the failure-event tree. In detail, in the event that the unreliability of "casing erosion" with respect to "creep damage and fatigue crack development" becomes higher than the unreliability of "steam leakage" with respect to "creep damage and fatigue crack development," the FETB unit 2 reverses the order of "steam leakage" and "casing erosion" in the failure-event tree shown in FIG. 2. In addition, in the event that "casing failure" is occurred after the occurrence of "creep damage and fatigue crack development" without occurring "steam leakage" and "casing erosion", the FETB unit 2 makes a new branch directly connecting "creep damage and fatigue crack development" to "casing failure" in the failure-event tree shown in FIG. 2.

Figure 9:
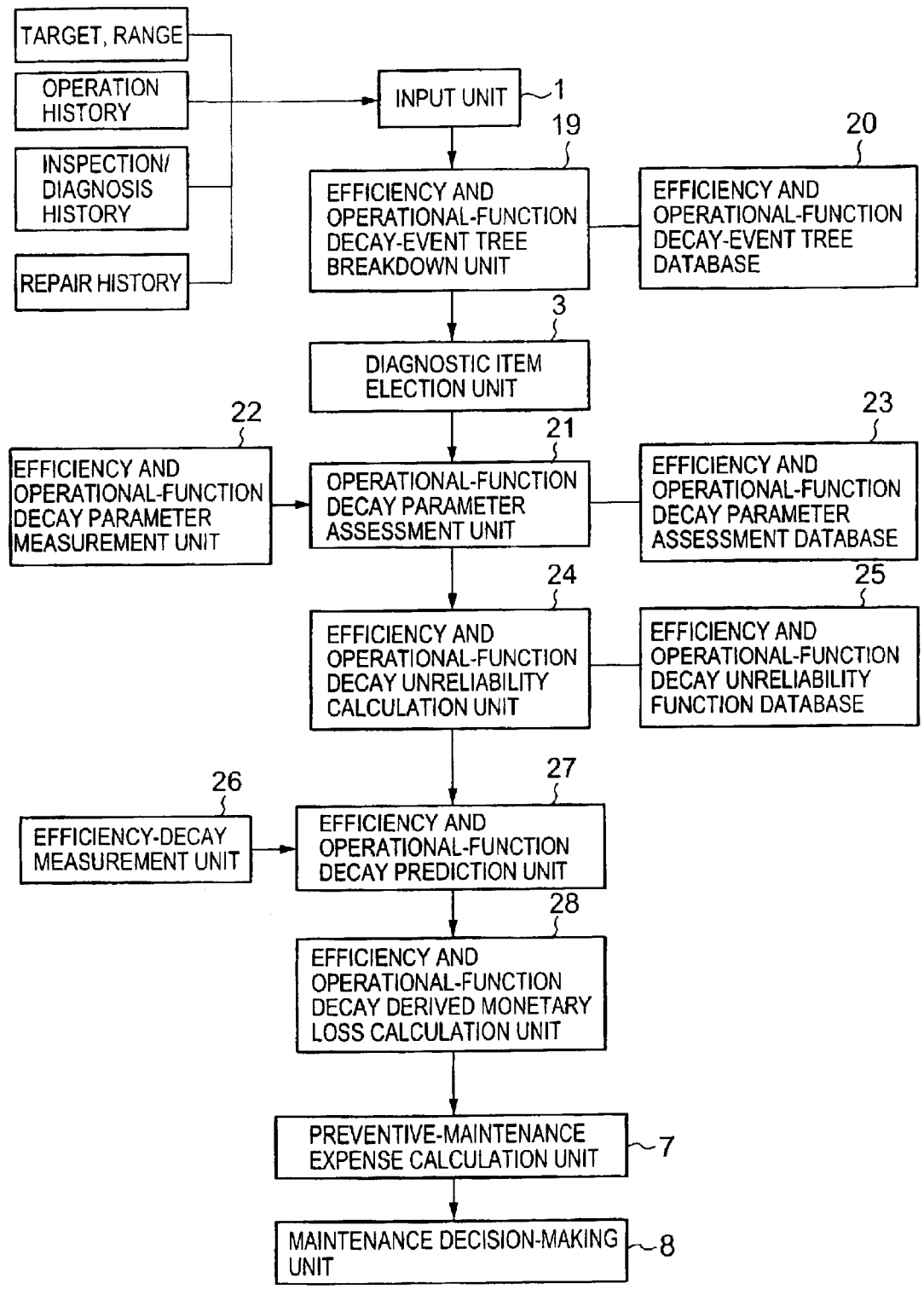
FIG. 9 shows a block diagram of a second embodiment according to the present invention.

FIG. 9 shows a block diagram of a second embodiment according to the present invention. Elements shown in FIG. 9 the same as or analogous to the elements shown in FIG. 1 are referenced by the same numerals.

Disclosed below are operations of the second embodiment against decay in efficiency and operational function, not damage to equipment parts, for life assessments.

Entered via the input unit 1 are targets and ranges of assessments, operation-, inspection-, diagnosis- and repair-history information, etc.

Figure 10:
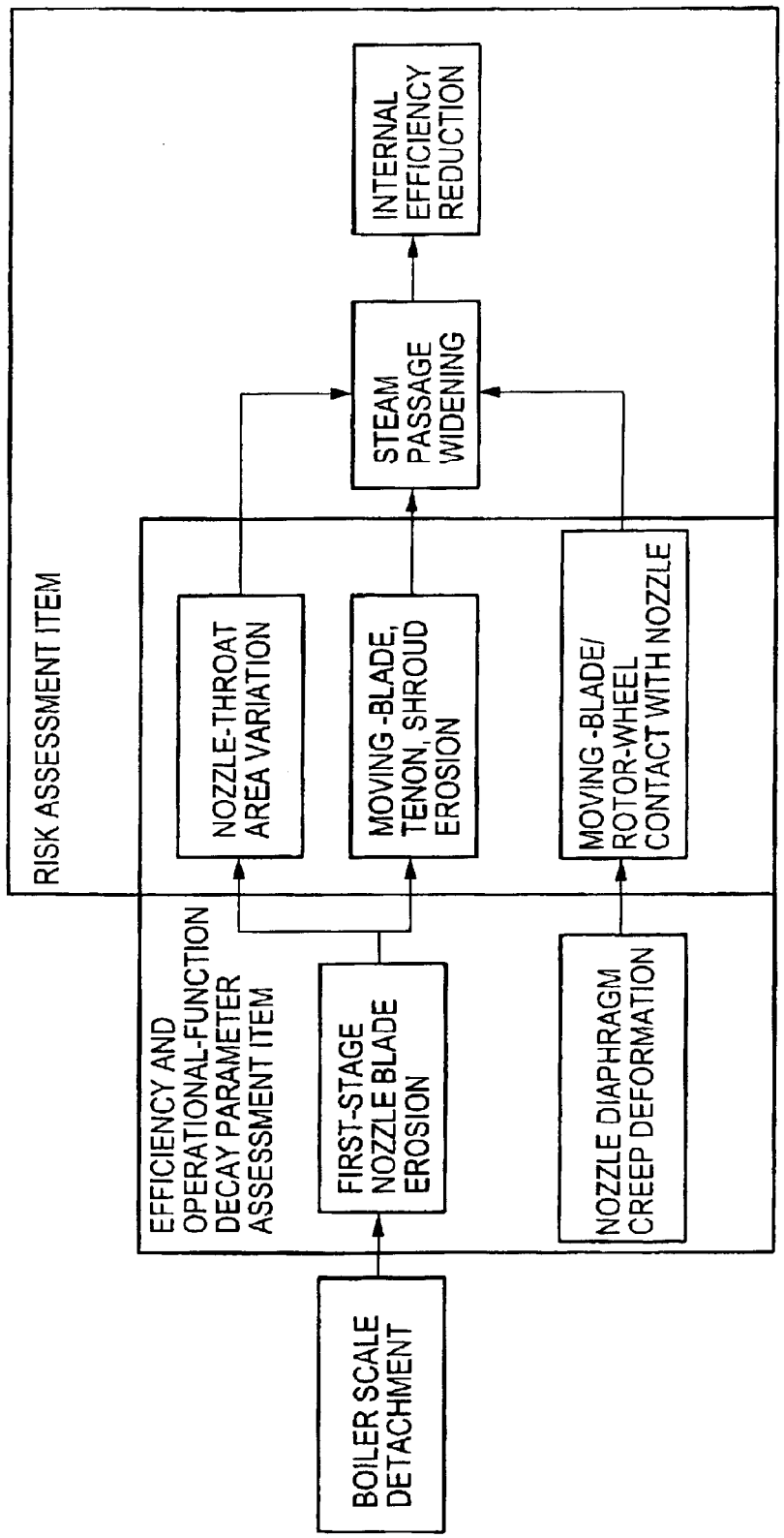
FIG. 10 shows a block diagram indicating efficiency and operational-function decay-event tree breakdown in the second embodiment according to the present invention.

Against efficiency-decay events on a steam-turbine nozzle, an efficiency and operational-function decay-event tree breakdown (EOFDETB) unit 19 performs efficiency and operational-function decay-event tree breakdown starting with erosion of the initial-stage nozzle blade and creep deformation of a nozzle diaphragm, as shown in FIG. 10, based on data stored in an efficiency and operational-function decay-event tree (EOFDET) database 20.

Erosion of the first-stage nozzle blade causes variation in the area of a nozzle throat and erosion of the shrouds and tenons of the moving-blades. Creep deformation of a nozzle diaphragm causes damage to the nozzle and a blade rotor wheel due to contact therewith. Either case results in increasing in an area of steam passages (including increasing in an area of the gap of the labyrinth seal), resulting in reduction in internal efficiency.

These events are subjected to the efficiency and operational-function decay-event tree breakdown at the EOFDETB unit 19. The four items discussed above are the starting items in the tree breakdown and selected by the DIS unit 3 as the items to diagnosed.

Figure 11:
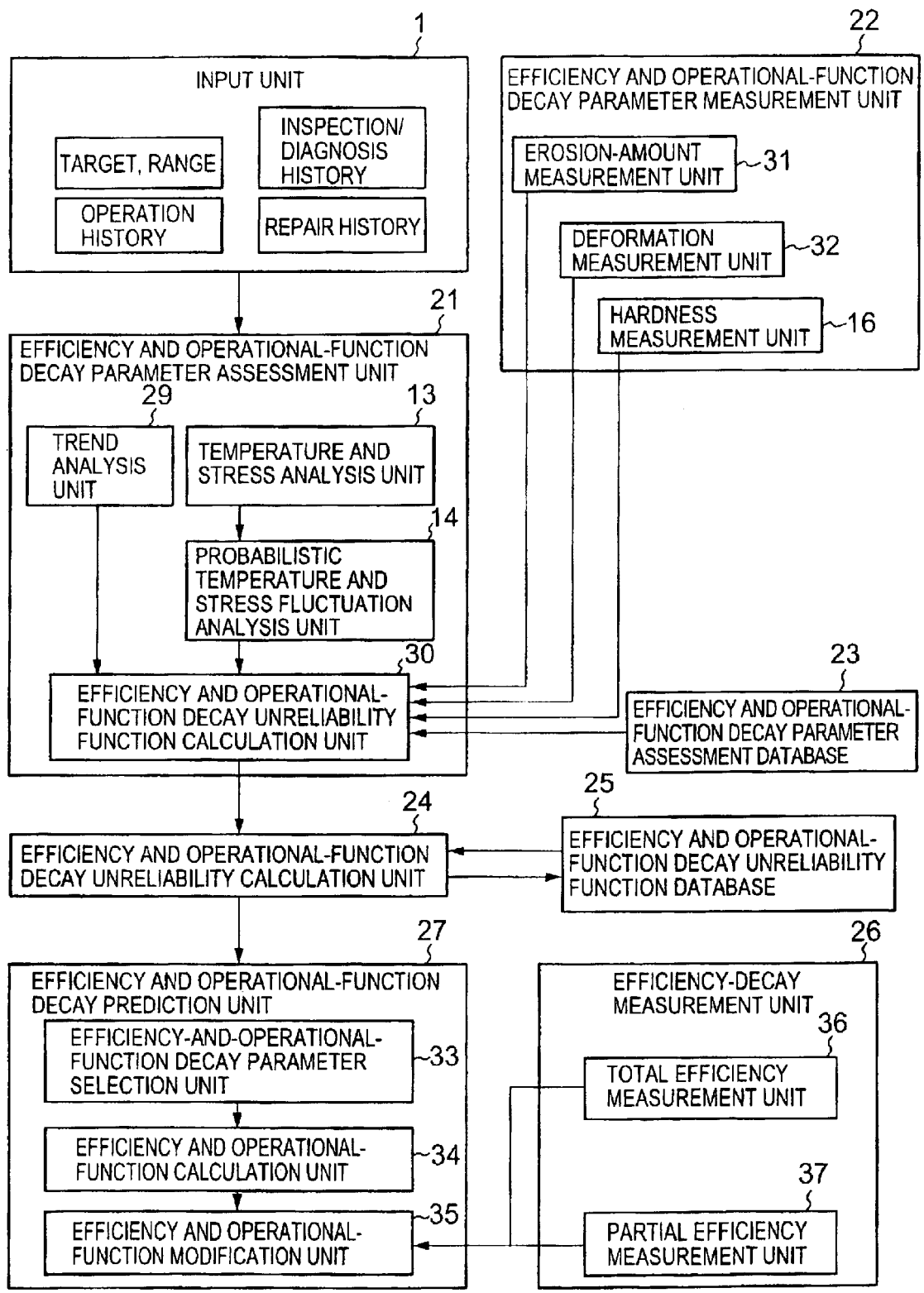
FIG. 11 shows a block diagram indicating an efficiency and operational-function decay parameter assessment procedure in the second embodiment according to the present invention.

FIG. 11 illustrates major procedures performed in the second embodiment shown in FIG. 9.

In an efficiency and operational-function decay parameter assessment (EOFDPA) unit 21, the results of two procedures performed by a trend analysis (TA) unit 29 and also the TSA and PTSFA units 13 and 14 are sent to an efficiency and operational-function decay unreliability function calculation (EOFDUFC) unit 30.

Figure 12:
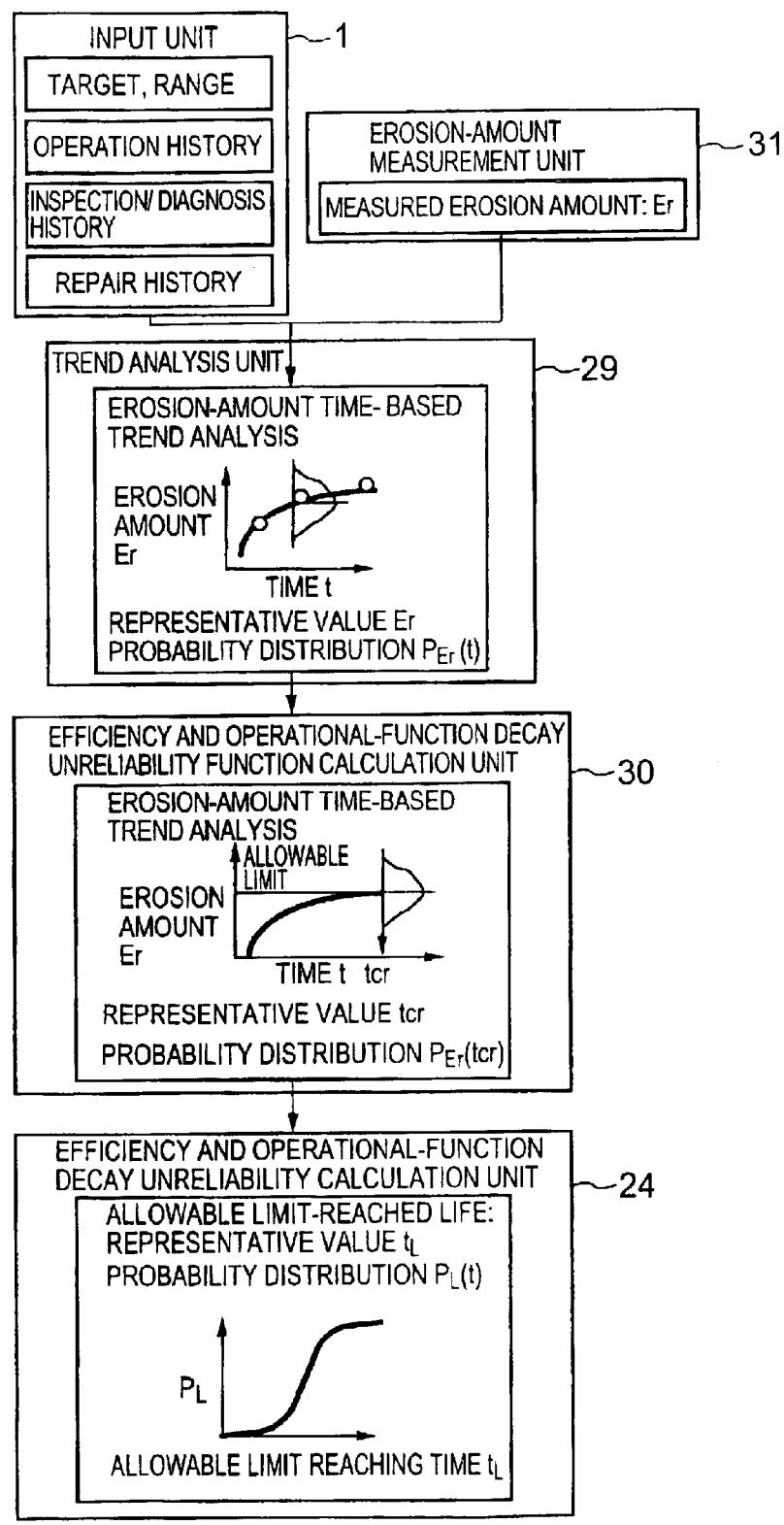
FIG. 12 shows a block diagram indicating an efficiency and operational-function decay parameter assessment procedure with erosion-amount trend analysis in the second embodiment according to the present invention.

Illustrated in FIG. 12 are assessments of erosion of the nozzle blades at the TA unit 29. Statistical approximation to the relationship between each past operation time "t" and an erosion amount Er, and their probability distribution $P_{Er}$ are given by the TA unit 29 based on erosion amounts measured by an erosion-amount measurement (EAM) unit 31 through image processing, etc.

The EOFDUFC unit 30 gives a life distribution $P_{Er}(t_{cr})$ of the timing in which the erosion amount reaches the allowable limit in view of efficiency.

The life distribution $P_{Er}(t_{cr})$ is combined with life distributions based on other factors and sent to an efficiency and operational-function decay unreliability calculation (EOFDUC) unit 24. These life distributions are allocated as unreliability to the efficiency and operational-function decay.

Figure 13:
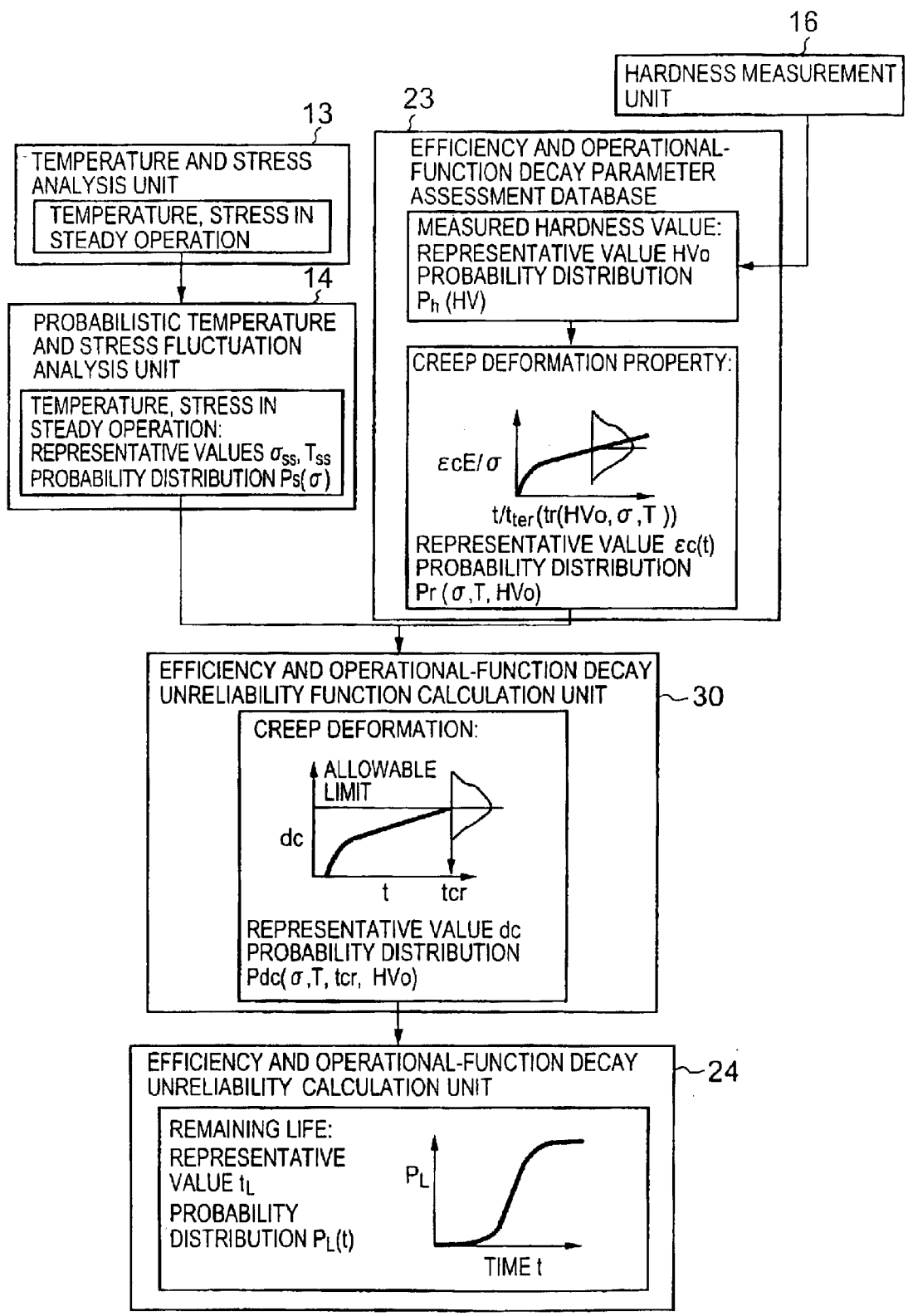
FIG. 13 shows a block diagram indicating an efficiency and operational-function decay parameter assessment procedure with creep deformation analysis in the second embodiment according to the present invention.

Illustrated in FIG. 13 are assessments based on temperature and stress analysis.

In detail, the temperature and stress representative values in steady operation are given by the TSA unit 13 and also the PTSFA unit 14 in the same way as the first embodiment.

Along with this, the hardness $HV_0$ measured by the HM unit 16 and its probability distribution Ph are applied to a creep-deformation property in an efficiency and operational-function decay parameter assessment (EOFDPA) database 23.

The creep-deformation property is expressed as follows and given with probability distribution Pr.

$$\epsilon_c = C(\sigma/E(T))[1-\exp\{-r(t^m/t_r^{mo})\}] + MCR(tr)*t \qquad (16)$$

where $\epsilon_c$: creep strain (%);

E(T): Young's modulus at an assessment temperature;

σ: stress;

tr: function of creep fracture time (σ, T, HV);

MCR: minimum creep rate (function of tr);

t: time; and

C, r, m and mo: constants.

The results of calculation at the PTSFA unit 14 are applied to the expression (16).

The EOFDUFC unit 30 calculates creep deformation dc with its probability distribution to give distribution $P_{dc}$ of the timing in which the creep deformation reaches the allowable limit in view of efficiency.

The distribution $P_{dc}$ is combined with efficiency and operational function decay parameter distributions based on other factors and sent to the EOFDUC unit 24. These distributions are allocated as unreliability to the efficiency and operational-function decay.

An efficiency-and-operational-function decay parameter selection (EOFDPS) unit 33 in an efficiency and operational-function decay prediction (EOFDP) unit 27 sets parameters, such as, pressure and flow rate, for converting the efficiency and operational-function decay factors (loosened joints of steam pipes and sealing) to losses in steam flow based on the calculation at the EOFDUC unit 24.

The parameters are sent to an efficiency and operational-function calculation (SOFC) unit 34 to calculate the level of efficiency decay.

In an efficiency-decay measurement unit 26, a total efficiency measurement unit 36 measures the total efficiency based on plant input and output while a partial efficiency measurement unit 37 measures partial efficiency based on signals from temperature, pressure and flow-rate sensors, etc.

The measured data are sent to the EOFDP unit 27 in which an efficiency and operational-function modification (SOFM) unit 35 makes adjustments with comparison of the measured data and the results of efficiency and operational-function decay calculation, to establish efficiency- and operational-function decay assessments to the target equipment.

Monetary losses expected from the efficiency and operational-function decay assessments and recovery costs against the efficiency and operational-function decay factors are sent to an efficiency and operational-function decay derived monetary loss calculation (EOFDDMLC) unit 28 shown in FIG. 9, for calculation of a cumulative cost, in the same as the first embodiment.

The cumulative cost is sent to the PMEC unit 7 for calculation of the total preventive maintenance expenses based on preventive maintenance expense assigned to several preventive measures against those events.

The total preventive maintenance expenses are sent to the MDM unit 8 for addition of depreciation and several maintenance fees to the total expenses. The expenses are expressed as a time-based function and compared with a risk cost. Maintenance timing is decided when the former is lower than the latter. If the plant is required to operate beyond the decided maintenance timing, life-time calculation is performed with switching the future operation patterns to select the pattern with the minimum risk cost among feasible operation patterns.

Discussed below is operational stoppage of valve stems for major valves in a steam turbine as an efficiency and operational-function decay factor.

Figure 14:
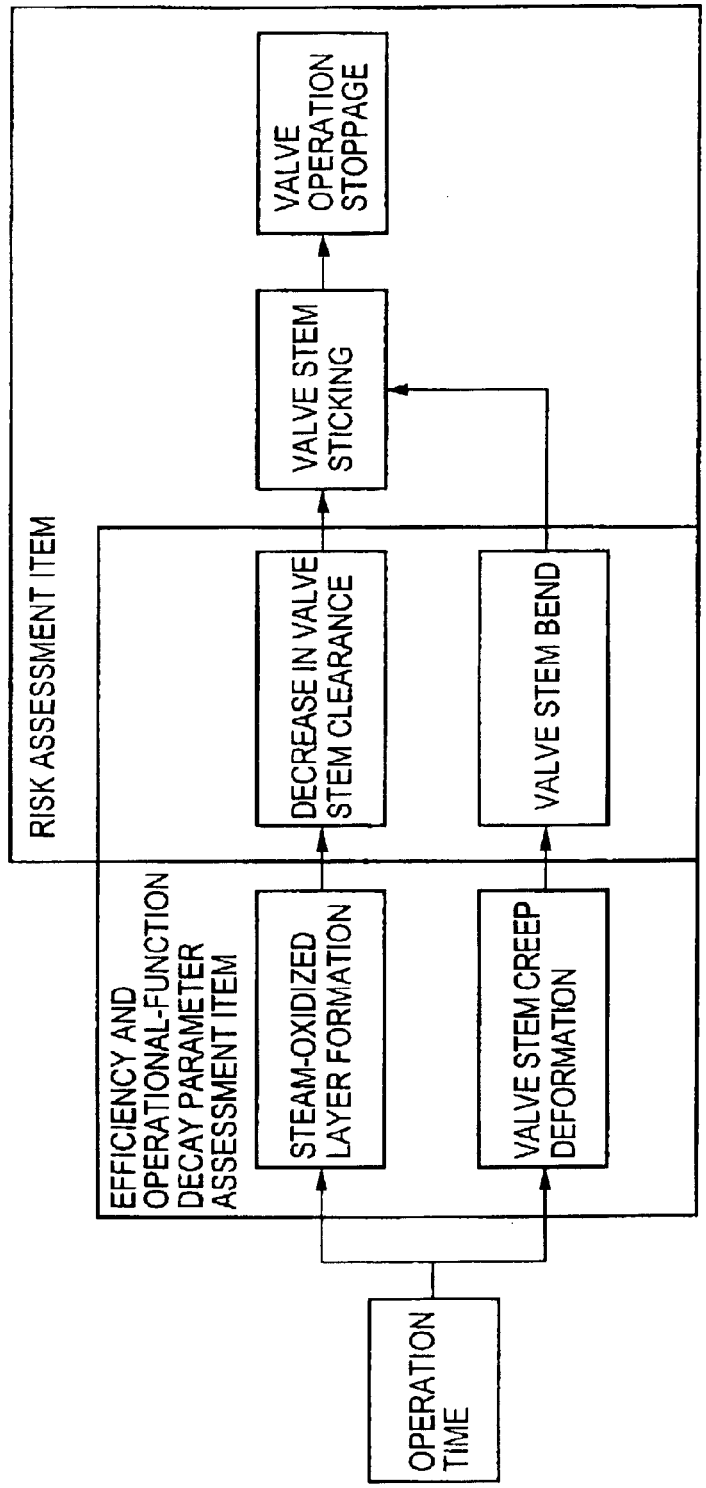
FIG. 14 shows a block diagram indicating efficiency and operational-function decay-event tree breakdown according to the present invention.
Figure 15:
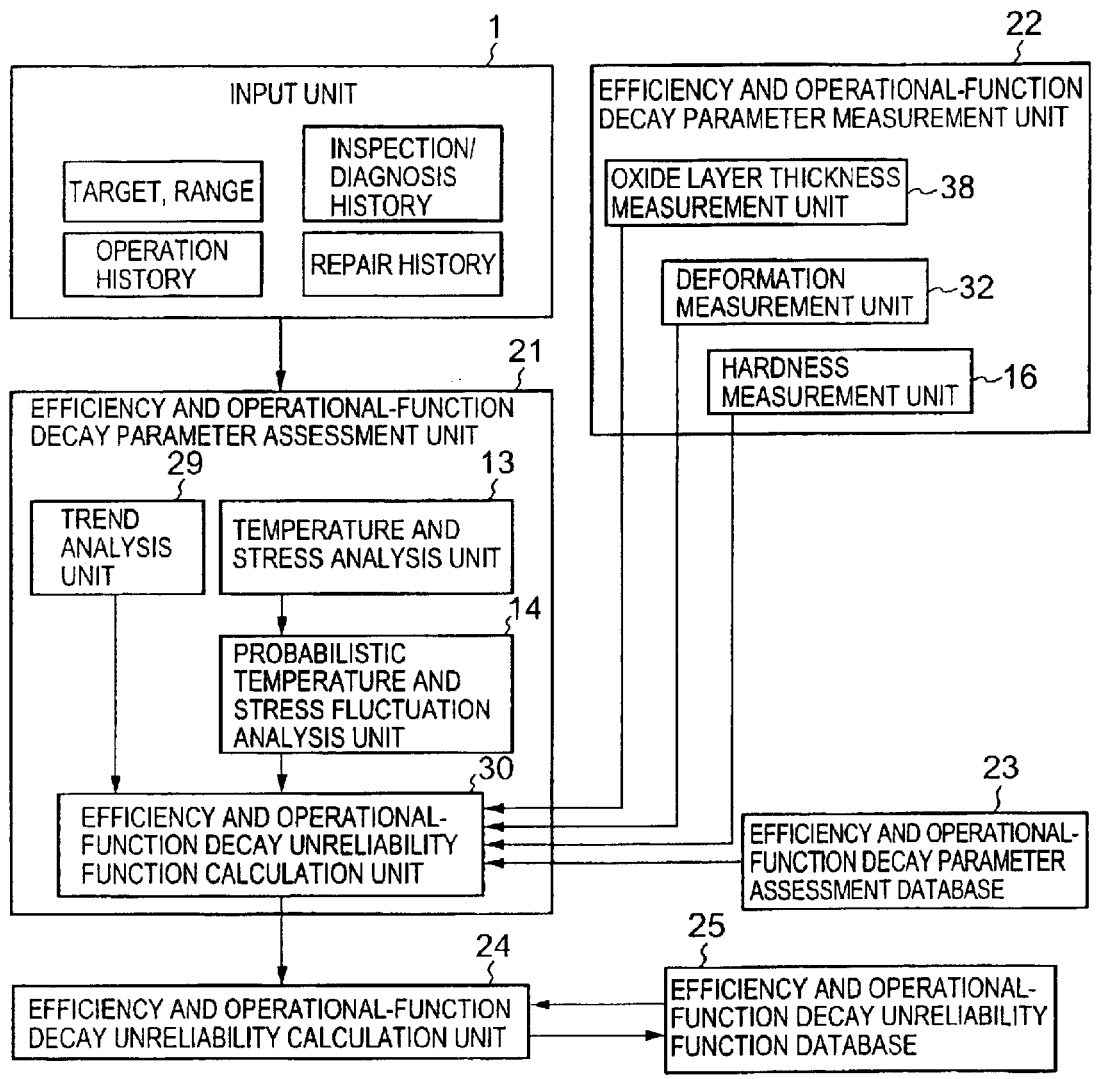
FIG. 15 shows a block diagram indicating an efficiency and operational-function decay parameter assessment procedure according to the present invention.

As indicated in FIG. 14, steam-oxide layer is gradually formed in the gap between a valve stem and a valve casing as plant operation continues, which causes sticking due to decrease in the gap, thus resulting in operational stoppage.

The valve stem is also suffered creep deformation and thus bent, which also results in operational stoppage.

The efficiency and operational-function decay-event tree breakdown is then performed at the EOFDETB unit 19 starting with the efficiency and operational-function decay factor, based on data stored in the EOFDET database 20.

In the EOFDPA unit 21, the results of two procedures performed by the TA unit 29 and also the TSA and PTSFA units 13 and 14 are sent to the EOFDUFC unit 30 for calculation of efficiency and operational-function decay unreliability function.

Figure 16:
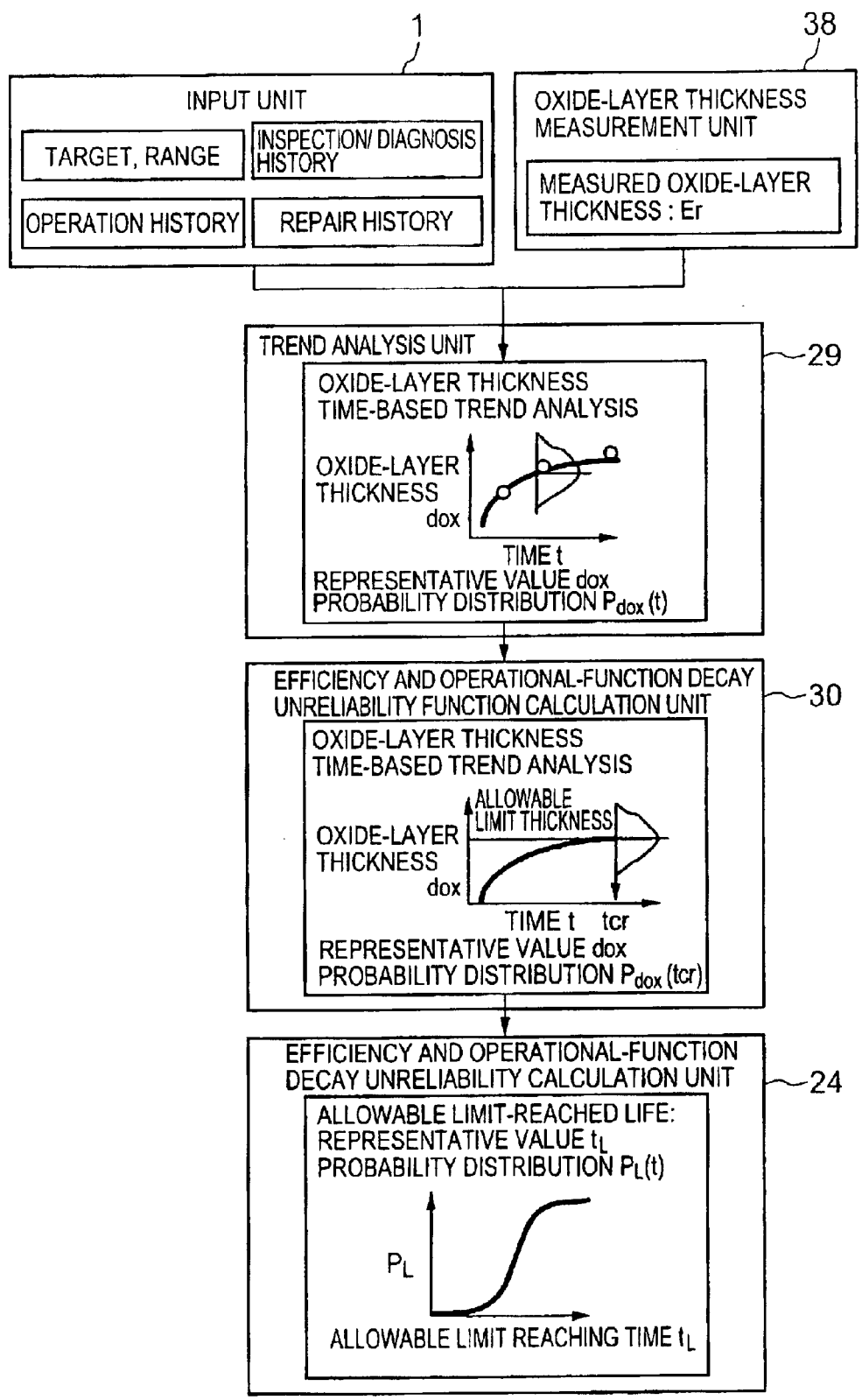
FIG. 16 shows a block diagram indicating an efficiency and operational-function decay parameter assessment procedure with oxide-layer thickness trend analysis according to the present invention.

Illustrated in FIG. 16 are assessments of oxide-layer thickness at the TA unit 29. Statistical approximation to the relationship between each past operation time "t" and an oxide-layer thickness dox, and their probability distribution $P_{dox}$ are given by the TA unit 29 based on oxide-layer thicknesses measured by an oxide-layer thickness measurement (OLTM) unit 38 through image processing, etc.

The EOFDUFC unit 30 gives a life distribution $P_{dox}(t_{cr})$ of the timing in which the oxide-layer thickness "dox" reaches the limit for causing sticking.

The life distribution $P_{dox}(t_{cr})$ is combined with life distributions based on other factors and sent to the EOFDUC unit 24. These life distributions are allocated as unreliability to the efficiency and operational-function decay.

Figure 17:
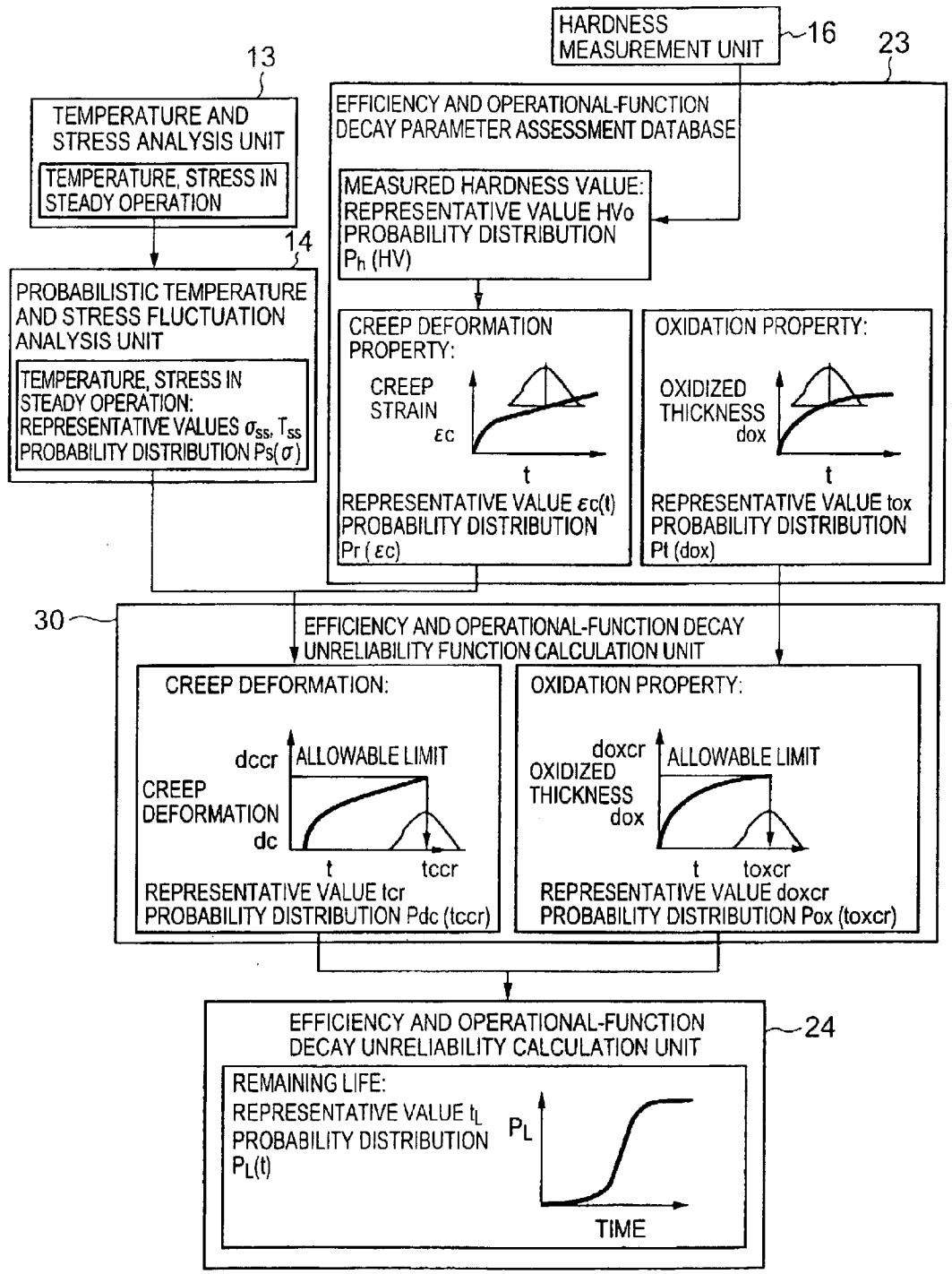
FIG. 17 shows a block diagram indicating an efficiency and operational-function decay parameter assessment procedure with hardness analysis to creep deformation and variation in oxide-layer thickness according to the present invention.

Illustrated in FIG. 17 are assessments based on temperature and stress analysis. In detail, the temperature and stress representative values in steady operation are given by the TSA unit 13 and also the PTSFA unit 14 in the same way as the first embodiment. Along with this, the hardness $HV_0$ measured by the HM unit 16 and its probability distribution Ph are applied to a creep-deformation property in the EOFDPA database 23. The creep-deformation property is given by the expression (16) with probability distribution Pt.

The oxide-layer thickness dox is given as follows.

$$dox = Dt^\beta \exp(-Q/kT) \qquad (17)$$

where t: time;

Q: activating energy;

k: Boltzmann constant;

T: temperature (K); and

D, β: constants.

The results of calculation at the PTSFA unit 14 are applied to the expressions (9) and (10).

The EOFDUFC unit 30 calculates creep deformation dc and oxide-layer thickness dox to the valve-opening bar with the probability distribution to give distributions $P_{dc}$ and Pox of the timing in which the creep deformation reaches the allowable limit in view of efficiency.

The distributions Pdc and Pox are combined with each other and sent to the EOFDUC unit 24. These distributions are assigned as unreliability which reads to the condition in that valve-opening bar cannot operate properly.

Monetary losses due to failures expected from the efficiency and operational-function decay assessments and recovery costs are sent to the EOFDDMLC unit 28 shown in FIG. 9, for calculation of cumulative cost, in the same as the first embodiment.

The cumulative cost is sent to the PMEC unit 7 for calculation of the total preventive maintenance expenses based on preventive maintenance expense assigned to several preventive measures against those events.

The total preventive maintenance expenses are sent to the MDM unit 8 for addition of depreciation and several maintenance fees to the total expenses. The expenses are expressed as a time-based function and compared with a risk cost function. Maintenance timing is decided when the former is lower than the latter. If the plant is required to operate beyond the decided maintenance timing, life-time calculation is performed with switching the future operation patterns to select the pattern with the minimum risk cost among feasible operation patterns.

As disclosed in detail, risks are expressed as costs against any predicted failure and operational function decay for plant equipment and compared with the preventive maintenance expenses, thus the second embodiment also offering a lowest-cost maintenance technique with the lowest risk probability.

Moreover, the efficiency and operational function decay assessment candidate items are employed by the diagnostic item selection unit, thus all of the efficiency and operational function decay assessment candidate items and the items for risk calculations being covered.

Furthermore, the second embodiment gives quantitative unreliability function to efficiency and operational function decay factors, thus achieving accurate prediction of efficiency and operational function decay.

An original form of the efficiency and operational-function decay-event tree is stored beforehand in the EOFDET database 20. The original form of the decay-event tree is made by expert engineers of the plant engineering by analyzing inspection histories and operation histories of plants similar to the plant to be maintained and by examining the correlation between the decay-events based on their technical experience. When inspection data on the plant to be maintained and/or on other similar plants and operation histories of the plants are renewed, the EOFDUC unit 24 re-calculates the decay unreliability between the decay events (items). The re-calculated decay unreliability is stored in the EOFDUC database 25. In addition, the EOFDETB unit 19 modifies the original form of the decay-event tree (or the decay-event tree having been previously modified) stored in the EOFDET database 20 on the basis of the re-calculation of the decay-unreliability, in other words, the EOFDETB unit 19 performs re-breakdown of the decay-event tree. In detail, as described in the first embodiment, the EOFDETB unit 19 reverses the order of the items in the decay-event tree, and makes a new branch.

As disclosed above in detail, the present invention combines life assessments and risk assessments, which have conventionally performed separately, thus achieving risk management against any failure events that lead to damage, efficiency decay and shutdown to plant equipment, the minimum management costs and also feasible plant operations with less losses.

What is claimed is:

1. An apparatus for maintaining plant equipment comprising:
   an input unit configured to receive data on inspection, diagnosis, repair and operation histories for an equipment that constitute a plant;
   a failure-event tree breakdown unit configured to perform failure-event tree breakdown on failures to be expected for component parts of the equipment, in order to obtain a failure-event tree;
   a probabilistic life assessment unit configured to predict unreliability of a starting event in the failure-event tree;
   a failure-unreliability function calculation unit configured to calculate unreliability between items in the failure-event tree;
   a failure-derived monetary loss calculation unit configured to multiply each unreliability and a cost of recovery from each failure-event in the failure-event tree and accumulate results of the multiplication in accordance with the failure-event tree breakdown, thus obtaining a recovery cost;
   a preventive-maintenance expense calculation unit configured to calculate preventive maintenance expenses for preventing failure events; and
   a maintenance decision-making unit configured to decide maintenance timing and technique through comparison between the recovery cost and the preventive maintenance expenses.

2. The apparatus for maintaining plant equipment according to claim 1, wherein the failure-event tree breakdown unit has a failure-event tree database constructed based on inspection and operation histories for the plant to be maintained and other plants, the failure-event tree breakdown unit is configured to perform the tree-breakdown starting with life-assessment candidate items while referring to the database in accordance with data on parts of the plant equipment and events input via the input unit, the apparatus further comprising a diagnostic item selection unit to select an item to be diagnosed for life assessments as input data or a starting event in the failure-event tree.

3. The apparatus for maintaining plant equipment according to claim 1, further comprising a degradation and damage measurement unit having a hardness measurement unit for measuring degradation and damage to the equipment, a replication and microstructural measurement unit and an embrittlement measurement unit for electrochemical measurements, the probabilistic life assessment unit calculating life probability distribution, as the unreliability, covering occurrence of cracks and damage to equipment parts from material-life probability distribution and variation in probability of operational requirements including temperature and stress applied to the equipment parts, based on data stored in a statistical life assessment database constructed of data from the degradation and damage measurement unit and also experimentally-obtained and statistically-processed data on material life.

4. The apparatus for maintaining plant equipment according to claim 1, wherein the failure-unreliability function calculation unit has a failure-unreliability function database constructed based on inspection and operation histories for the plant to be maintained and other plants, the failure-unreliability function calculation unit configured to calculate the unreliability while referring to the database based on failure-unreliability function on each event in the failure-event tree in accordance with information on parts of the plant equipment and events input via the input unit, and the failure-unreliability function calculation unit is also configured to calculate unreliability of life diagnostic items based on the prediction by the probabilistic life assessment unit.

5. The apparatus for maintaining plant equipment according to claim 1, wherein the failure-event tree breakdown unit and the failure-unreliability function calculation unit configured to adjust the order of events in the failure-event tree and failure-unreliability function values in accordance with input data on inspection, diagnosis, repair and operation histories for the plant and other plants and the prediction by the probabilistic life assessment unit.

6. An apparatus for maintaining plant equipment comprising:
   an input unit configured to receive data on inspection, diagnosis, repair and operation histories for equipment that constitute a plant;
   an efficiency and operational-function decay-event tree breakdown unit configured to perform efficiency and operational-function decay-event tree breakdown on efficiency and operational-function decay factors to be expected for the equipment, in order to make an efficiency and operational-function decay-event tree;
   an efficiency and operational-function decay parameter assessment unit configured to predict unreliability of at least one starting item in the efficiency and operational-function decay-event tree;
   an efficiency and operational-function decay unreliability calculation unit configured to calculate unreliability of each item in the efficiency and operational-function decay-event tree based on failure unreliability function;
   an efficiency and operational-function decay prediction unit to calculate efficiency and operational-function decay configured to be expected based on prediction by the efficiency and operational-function decay unreliability calculation unit;
   an efficiency and operational-function decay derived monetary loss calculation unit configured to multiply each unreliability and monetary loss due to efficiency and operational-function decay and a cost of recovery from the decay and accumulate results of the multiplication in accordance with the efficiency and operational-function decay-event tree breakdown;
   a preventive-maintenance expense calculation unit configured to calculate preventive maintenance expenses for preventing the efficiency and operational-function decay; and an operation and maintenance decision-making unit configured to decide maintenance timing and technique through comparison between the recovery cost and the preventive maintenance expenses.

7. The apparatus for maintaining plant equipment according to claim 6, wherein the efficiency and operational-function decay-event tree breakdown unit has an efficiency and operational-function decay-event tree database constructed based on inspection and operation histories for the plant and other plants, the efficiency and operational-function decay-event tree breakdown unit is configured to perform the tree breakdown starting with at least one efficiency and operational-function decay assessment item while referring to the database in accordance with data on parts of the plant equipment and events input via the input unit, the apparatus further comprising a diagnostic item selection unit configured to select the efficiency and operational-function decay assessment item as input data or a starting event in the efficiency and operational-function decay-event tree breakdown.

8. The apparatus for maintaining plant equipment according to claim 6, further comprising an efficiency and operational-function decay parameter measurement unit for measuring degradation of and damage to the equipment to cause efficiency and operational function decay, the efficiency and operational-function decay parameter assessment unit is configured to calculate life probability distribution, as the unreliability, covering efficiency and operational-function decay factors to equipment parts from material-life probability distribution covering deformation, cracks, oxidation, erosion and abrasion to become efficiency and operational-function decay factors and variation in probability of operational requirements including temperature and stress applied to the equipment parts, based on data stored in an efficiency and operational-function decay parameter assessment database constructed of data from the efficiency and operational-function decay parameter measurement unit and also experimentally-obtained and statistically-processed data on life affected by the efficiency and operational-function decay factors.

9. The apparatus for maintaining plant equipment according to claim 6, wherein the efficiency and operational-function decay unreliability calculation unit has an efficiency and operational-function decay unreliability function database constructed based on inspection and operation histories for the plant and other plants, the efficiency and operational-function decay unreliability calculation unit is configured to calculate the unreliability based on failure unreliability function on each event in the efficiency and operational-function decay-event tree in accordance with data on parts of the plant equipment and events input via the input unit, and also calculating unreliability of efficiency and operational-function decay factors based on the prediction by the efficiency and operational-function decay parameter assessment unit.

10. The apparatus for maintaining plant equipment according to claim 6, wherein the efficiency and operational-function decay prediction unit has an efficiency and operational-function measurement unit configured to measure equipment partial efficiency and plant total efficiency while monitoring at least a signal of in-plant fluid pressure, temperature, rotation speed, load, vacuum, in-liquid impurity density, cooling speed and time, deformation, displacement, decrease in wall thickness, fluid-level height and vibration, calculation results from the efficiency and operational-function decay unreliability calculation unit being adjusted based on measurement results from the efficiency and operational-function measurement unit, to predict efficiency and operational-function decay.

11. A method of maintaining plant equipment comprising the steps of:

receiving data on inspection, diagnosis, repair and operation histories for equipment that constitute a plant;

performing failure-event tree breakdown on failures to be expected for the equipment, thereby obtaining a failure-event tree;

predicting unreliability of at least one starting item in the failure-event tree;

calculating unreliability of each item in the failure-event tree based on a failure unreliability function;

multiplying each unreliability and a cost of recovery from each failure event in the failure-event tree and accumulating results of the multiplication in accordance with the tree breakdown, thus obtaining a recovery cost;

calculating preventive maintenance expenses for preventing failure events; and deciding maintenance timing and technique through comparison between the recovery cost and the preventive maintenance expenses.

12. A method of maintaining plant equipment comprising the steps of:

receiving data on inspection, diagnosis, repair and operation histories for equipment that constitute a plant;

performing efficiency and operational-function decay event-tree breakdown on efficiency and operational-function decay factors to be expected for the equipment, thereby obtaining a efficiency and operational-function decay event-tree;

predicting unreliability of at least one starting item in the efficiency and operational-function decay event-tree;

calculating unreliability of each item in the efficiency and operational-function decay-event tree based on failure unreliability function;

calculating efficiency and operational-function decay to be expected from the calculation based on the failure unreliability function;

multiplying each unreliability and monetary loss due to efficiency and operational-function decay and a cost of recovery from the decay and accumulating results of the multiplication in accordance with the efficiency and operational-function decay-event tree breakdown;

calculating preventive maintenance expenses for preventing the efficiency and operational-function decay; and deciding maintenance timing and technique through comparison between the recovery cost and the preventive maintenance expenses.

* * * * *